United States Patent [19]
Duffy et al.

[11] Patent Number: 5,911,043
[45] Date of Patent: Jun. 8, 1999

[54] SYSTEM AND METHOD FOR COMPUTER-BASED RATING OF INFORMATION RETRIEVED FROM A COMPUTER NETWORK

[75] Inventors: Robert A. Duffy, Plano; Lyle N. Griffin, Richardson, both of Tex.

[73] Assignee: Baker & Botts, L.L.P., Dallas, Tex.

[21] Appl. No.: 08/725,342

[22] Filed: Oct. 1, 1996

[51] Int. Cl.$^6$ .................................................. G06F 17/00
[52] U.S. Cl. ..................................................... 395/200.33
[58] Field of Search .................... 395/200.11, 21, 395/23, 200.33, 200.49; 707/9, 2

[56] References Cited

U.S. PATENT DOCUMENTS

| | | | |
|---|---|---|---|
| 5,317,507 | 5/1994 | Gallant | 364/419.13 |
| 5,678,041 | 10/1997 | Baker et al. | 395/609 |
| 5,696,898 | 12/1997 | Baker et al. | 395/187.01 |
| 5,706,507 | 1/1998 | Schloss | 395/615 |

OTHER PUBLICATIONS

Voters Telecommunications Watch, Internet Parental Control Frequently Asked Questions (FAQ), http://www.panix.com/vtw/exon/index.html, all pages 1995.

*Primary Examiner*—Ellis B. Ramirez
*Attorney, Agent, or Firm*—Baker & Botts, L.L.P.

[57] ABSTRACT

A system for rating information retrieved from a computer network includes a server and a client. The server includes a rate module that generates a rate file for documents retrieved from the network. A client includes a screen module that accesses the rate file to prevent access to certain documents by the user of the client.

24 Claims, 4 Drawing Sheets

FIG. 3

| NON-IP ADDRESS | IP ADDRESS | SEX NUMERICAL | SEX CATEGORY | SEX OVERRIDE | VIOLENCE NUMERICAL | VIOLENCE CATEGORY | VIOLENCE OVERRIDE |
|---|---|---|---|---|---|---|---|
| http:\\www.intergo.com | 111.11.1.11 | 0.0 | EC | KA | — | — | — |
| ftp.nudes | 222.22.2.22 | 27.3 | AO | — | 1.2 | EC | — |
| joe@intergo.com | — | 15.1 | T | — | 12.3 | T | — |
| http:\\home.billy.com | 333.33.3.33 | 20.0 | M | — | 25.4 | AO | — |
| ftp.disney | 444.44.4.44 | 6.5 | KA | T | 0.2 | EC | KA |
| http:\\www.violence.* | 555.*.*.* | — | M | — | — | M | — |
| comp.apple.tools | — | — | AO | — | — | AO | — |
| religion.misc | — | 14.7 | T | 22.0 | 13.2 | T | — |
| techinfo.mit.edu | — | 0.0 | EC | — | 0.0 | EC | — |

SYSTEM AND METHOD FOR COMPUTER-BASED RATING OF INFORMATION RETRIEVED FROM A COMPUTER NETWORK

TECHNICAL FIELD OF THE INVENTION

This invention relates in general to data communication and processing, and more particularly to rating information retrieved from a computer network.

BACKGROUND OF THE INVENTION

A computer network, such as a global computer network like the Internet, may contain a vast collection of information. Individuals, companies, and institutions generate and maintain this information for a variety of uses and purposes. Traditional techniques to access this information may include a browser suitable for accessing information on the World Wide Web (WWW), a file transfer protocol (FTP), Gopher, TelNet, UseNet, or Archie utility, electronic mail, bulletin boards, newsgroups, or any other protocol or technique.

The information "posted" or otherwise made available on the Internet may vary greatly in content. Much of this information may be business or technical in nature. However, due to the diversity and number of persons using the Internet and their freedom and willingness to express, much of the material available on the Internet may be inappropriate for particular age groups. For example, information containing explicit language, sexual subject matter, violent depictions, or other adult material may be widely available on a global computer network like the Internet.

Therefore, some efforts attempt to rate information to provide age-appropriate access to the Internet. For example, one technique codes the information with a caution level indicating how likely the material will be considered objectionable. This particular technique requires the content developer to embed a content rating code into the information. To date, only a fraction of the information available on the Internet includes any form of standardized or recognizable content rating code. Moreover, existing rating approaches are inflexible and not adapted to the various technologies used to retrieve information from the Internet.

SUMMARY OF THE INVENTION

In accordance with the present invention, the disadvantages and problems associated with rating information retrieved from a computer network have been substantially reduced or eliminated. In particular, the present invention provides an automated rating technique adaptable to a wide variety of access technologies used in a global computer network like the Internet.

In accordance with one embodiment of the present invention, a system for rating information retrieved from a computer network includes a retrieve module coupled to the computer network and operable to retrieve a document from the computer network using a document address. A rate module coupled to the retrieve module generates a document rating for the document in response to the content of the document. A database stores the document rating and the document address.

Important technical advantages of the present invention include a rating technique that produces document ratings by analyzing the specific content or words and phrases in the document. In particular, a rate module located in a client or server environment applies rating rules to a retrieved document. In a particular embodiment, the rate module generates a document rating by summing numerical rule ratings associated with a document. A user rating may specify a range of document ratings accessible by a particular user, where a higher document rating indicates more restricted information. A database stores the document rating together with associated document addresses, which may by an Internet protocol (IP) address, a uniform resource locator (URL) address, or any other appropriate addresses to identify the document. Each document may include a number of document ratings associated with a particular rating category, such as sex, violence, and profanity.

Another technical advantage of the present invention includes providing a rating technique that applies to a host of access technologies, such as a browser suitable for accessing information on the World Wide Web (WWW), a file transfer protocol (FTP), Gopher, UseNet, TelNet, or Archie utility, bulletin boards, newsgroups, electronic mail or any other protocol or technique to access information over the network. Moreover, the present invention supports use of wildcard characters in a document address to identify a high level document and associated lower level documents with a particular document rating. Furthermore, the determined document rating may be re-evaluated, over-written, or updated to reflect a subject assessment of the content of a document by a user.

Another important technical advantage of the present invention includes a technique for screening information using the document ratings described above. For example, software running on a computer executes a screening function to provide age-appropriate access to the Internet. A first screening technique retrieves document ratings using the document address, and compares the document ratings to appropriate user ratings to determine whether access is appropriate. A second screening technique dynamically rates a document as it is retrieved to determine if it is appropriate for presentation to the user. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 3 illustrates a table of document addresses and document ratings; and

DETAILED DESCRIPTION OF THE INVENTION

Figure 1:
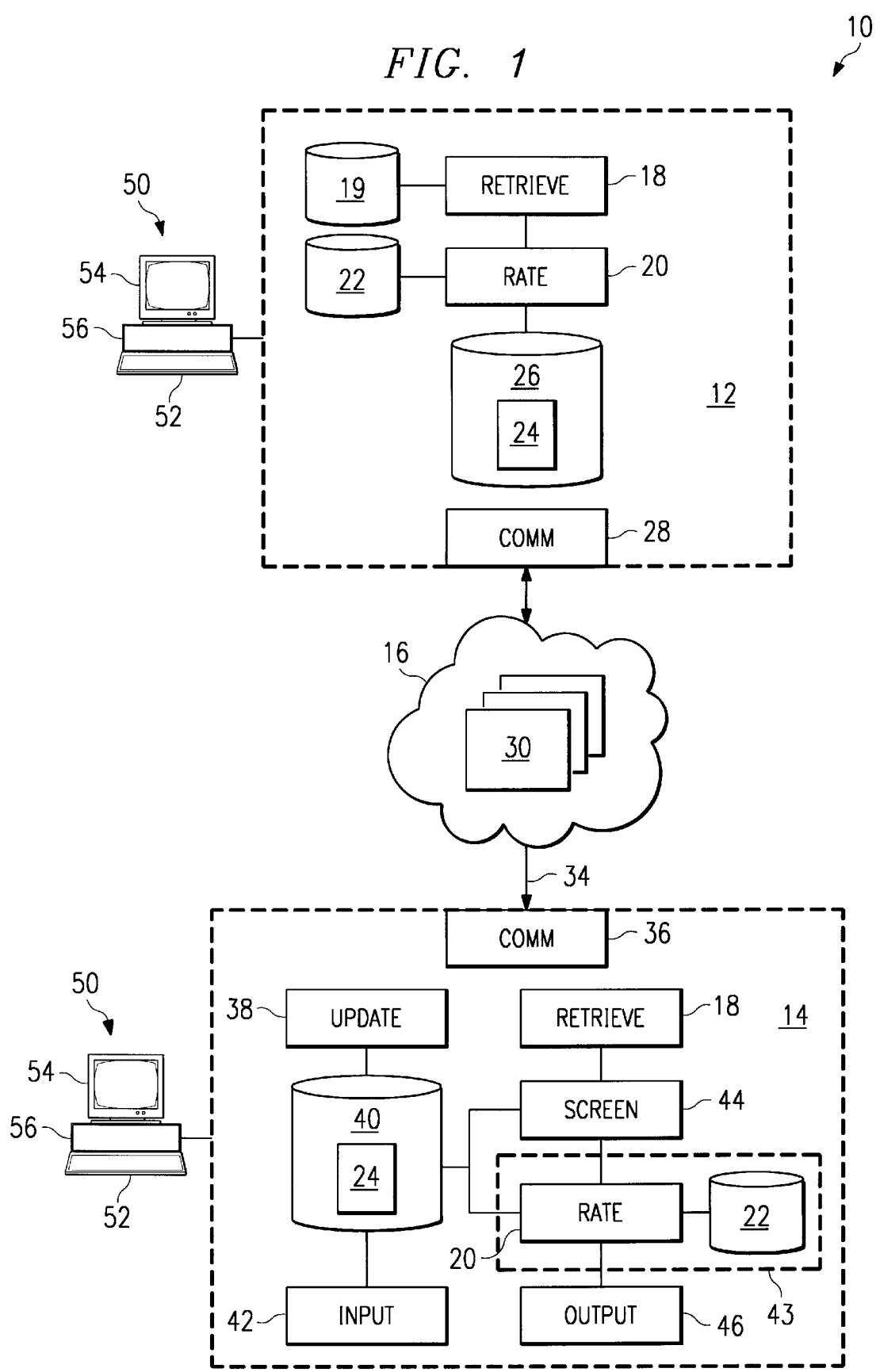
FIG. 1 illustrates a system for rating information.

FIG. 1 illustrates a system 10 that includes a server 12 and a client 14 coupled to a computer network 16, such as a global computer network like the Internet. In operation, server 12 retrieves information from network 16 in the form of documents and generates document ratings for each document. These document ratings may be used by client 14 to screen information retrieved from network 16.

Server 12 includes a retrieve module 18 coupled to network 16 and a document database 19. A rate module 20 is coupled to retrieve module 18 and a rating rules database 22. Document ratings generated by rate module 20 are stored in database 26. A communications module 28 is coupled to network 16 and provides bidirectional communication between components of server 12 and network 16.

In a particular embodiment, network 16 encompasses the hardware and software that combine to form a global computer network known as the Internet. Furthermore, network 16 may represent hardware and software used in any other kind of computer network or communications network, such as a local area network (LAN), wide area network (WAN), public switched telephone network, integrated services digital network (ISDN), private branch exchange (PBX), or any other appropriate technology or technique that allows components of system 10 to communicate information. Although server 12 and client 14 are referred to in the nomenclature of a client/server environment, it should be understood that server 12 and client 14 may be any type of computer operating in any suitable environment that communicate using network 16.

In addition to the communications hardware and software described above, network 16 also includes one or more processing and memory devices. Specifically, memory of devices in network 16 store information in the form of documents 30 that may be accessed by server 12 and client 14. Throughout this description, documents 30 may represent any format, structure, or arrangement of information that includes machine-readable or user-readable text. In a particular embodiment, documents 30 comprise information accessible over the Internet written in HyperText Markup Language (HTML), HTML+, Standard Generalized Markup Language (SGML), Virtual Reality Markup Language (VRML), or any other appropriate content development language. Document 30 may also include program code, such as programs written in JAVA developed by SUN MICROSYSTEMS, that add additional functionality.

In operation, retrieve module 18 retrieves documents from network 16 using a variety of techniques. For example, retrieve module 18 may include a browser that can specify a uniform resource locator (URL) address or Internet protocol (IP) address to retrieve a selected document. Retrieve module 18 may also include hardware and software that supports file transfer protocol (FTP), Gopher, UseNet, TelNet, Archie, bulletin boards, news groups, electronic mail, or other protocol or technique that allows information in the form of documents 30 to be retrieved from network 16. Communications module 28 may include all or a portion of the hardware and software used by retrieve module 18 to access documents 30 in network 16.

Retrieve module 18 passes a document retrieved from network 16 to rate module 20. Using a method described below in detail with reference to FIG. 2, rate module 20 accesses rating rules database 22 to generate one or more document ratings. Each rule in rating rules database 22 may specify a word or phrase and a rule rating indicating if and to what degree a word or phrase is inappropriate, objectionable, or offensive for a particular age group, geographical location, demographical grouping, or other consideration. Also, the rules in rating rules database 22 may include one or more proximity requirements for the rated words and phrases to ensure that rate module 20 performs its rating function correctly. For example, a rated word "breast" in close proximity to "nudity" or other sexually suggestive words may trigger a rating of 0.5 (moderately offensive), whereas the same word would have a rating of 0.0 (not offensive) when used in the context of "breast cancer." In this specific example, the more objectionable, inappropriate, or offensive the word or phrase, the higher the numeric value. Rating rules stored in rating rules database 22 may be arranged into rule-sets that correspond to particular rating categories, such as sex, violence, profanity, and racism.

Database 26 stores the document ratings together with one or more document addresses in a rate file 24, shown below in more detail with reference to FIG. 3. Server 12 using communications module 28 and network 16 communicates all or a portion of rate file 24 to client 14. Although FIG. 1 illustrates a single client 14 coupled to server 12, system 10 contemplates many clients 14 coupled to server 12 to receive rate file 24.

Client 14 includes a communications module 36 which provides bidirectional communication between components of client 14 and network 16. An update module 38 is coupled to a database 40 which stores rate file 24 that may be identical to, a portion of, or otherwise related to rate file 24 maintained in database 26 of server 12. An input module 42 is coupled to database 40 and allows access to and modification of rate file 24.

Client 14 also includes a similar retrieve module 18, rate module 20, and rating rules database 22 as server 12. For convenience, the reference numeral for these components is the same reference numeral for structurally and functionally similar components in server 12. As indicated by dashed line 43, the functionality provided by rate module 20 and rating rules database 22 is optional in client 14. A screen module 44 is coupled to retrieve module 18. Both screen module 44 and rate module 20 are coupled to database 40 to access and modify rate file 24. An output module 46 is coupled to rate module 20, screen module 44, or both rate module 20 and screen module 44 and conveys information to the user of client 14, including digital data, visual information, or audio information.

In operation, client 14 receives all or selected portions of rate file 24 in database 26 from server 12 using network 16, communications module 36, and update module 38, and stores this information in database 40. Input module 42 and rate module 20 access rate file 24 in database 40 to supplement, add, delete, or otherwise modify document ratings contained in rate file 42. Input module 42 allows the user of client 14 to specify new document ratings or override existing document ratings after reviewing information contained in a particular document. Optional rate module 20 and rating rules database 22 generate a document rating in a similar fashion as server 12 for documents retrieved from network 16 that do not have document ratings in rate file 24 stored in database 40.

Update module 38 may generate a message that includes updated, new, or modified document ratings stored in rate file 24 for delivery to server 12 using communication module 28 and network 16. This allows server 12 to collect document ratings from a number of clients 14 that have either rated new documents using rate module 20 or received an override or updated rating from the user of client 14 using input module 42. The new and updated document ratings may be incorporated into rate file 24 stored in database 26 in any suitable manner. Therefore, server 12 may rate documents retrieved from network 16 and also collect document ratings generated by clients 14 as a result of a similar automated rating procedure or as a result of user input. The present invention contemplates any form of communication, cooperation, or synchronization between database 26 in server 12 and database 40 in one or more clients 14 to update, supplement, and maintain rate file 24.

Screen module 44 receives a document address from retrieve module 18, retrieves associated document ratings from rate file 24 stored in database 40, and determines whether the document retrieved from network 16 is appropriate for presentation to the user of client 14. As described below in more detail with reference to FIG. 4, screen module 44 accesses document ratings in rate file 24 stored in database 40 and prevents the retrieval or conveyance of information that is inappropriate, objectionable, or offensive based on user ratings of the user of client 14. The user ratings correspond to the rating categories (sex, violence, profanity, etc.) of document ratings and may be based on age, geography, demographics, or any other appropriate consideration. Screen module 44 may perform a screen function statically for a rated document by accessing rate file 24 or dynamically as retrieve module 18 retrieves an unrated document from network 16.

Server 12 and client 14 may operate on one or more computers, shown generally as computers 50. Each computer 50 maintains and executes the instructions to implement retrieve module 18, rate module 20, communications modules 28 and 36, update module 38, input module 42, screen module 44, and output module 46 in system 10. Each module described above with reference to server 12 and client 14 comprises any suitable combination of hardware and software in computer 60 to provide the described function or operation of the module. For example, modules may include program instructions and associated memory and processing components to execute the program instructions. Also, modules illustrated in FIG. 1 may be separate from or integral to other modules. Document database 19, rating rules database 22, rate file 24, and databases 26 and 40 may comprise one or more files, lists, or other arrangement of information stored in one or more components of random access memory (RAM), read only memory (ROM), magnetic computer disk, CD-ROM, other magnetic or optical storage media, or any other volatile or non-volatile memory.

Each computer 50 includes an input device 52 such as a keypad, touch screen, mouse, or other device that can accept information. Output device 54 conveys information associated with the operation of system 10, including digital data, visual information, or audio information. Both input device 52 and output device 54 may include fixed or removable storage media such as a magnetic computer disk, CD-ROM, or other suitable media to both receive output from and provide input to server 12 and client 14. Processor 56 and its associated memory execute instructions and manipulate information in accordance with the operation of system 10.

Figure 2:
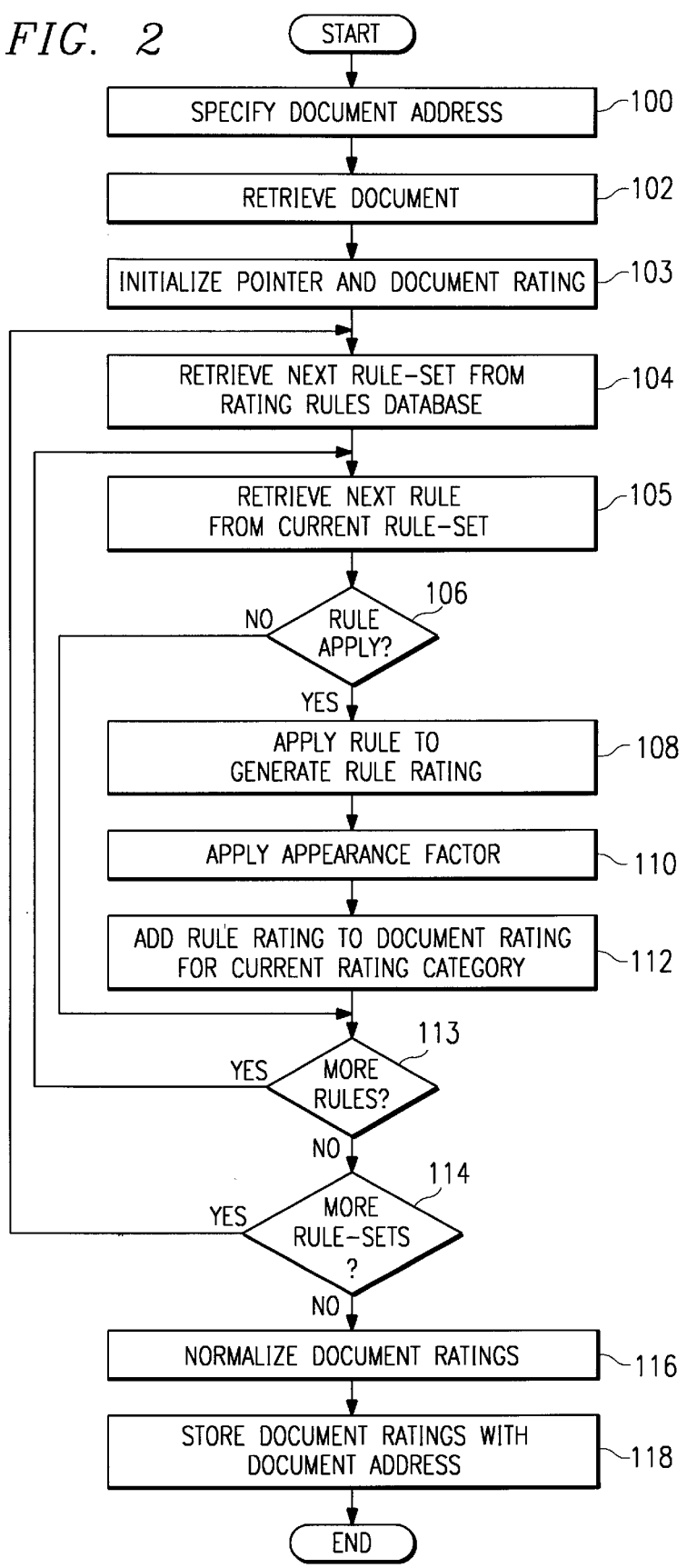
FIG. 2 illustrates a flow chart of a method for generating document ratings.

FIG. 2 illustrates a flow chart of method for generating document ratings using rate module 20. As illustrated in FIG. 1, this method is performed at server 12 to generate document ratings for documents retrieved from network 16. In a particular embodiment, this same operation may be performed by a similar rate module 20 at client 14. For purposes of clarity, the flow chart of FIG. 2 will be described with reference to the operation of rate module 20 at server 12.

The method begins at step 100 where a document address is specified. In one embodiment, this may be done in response to a user of server 12 specifying a URL address, IP address, or other appropriate address for a selected document. In a particular embodiment, this procedure may be automated by implementing a crawler function in retrieve module 18. This function may begin by specifying an address to retrieve a document from network 16. Retrieve module 18 extracts all other document addresses contained within the retrieved document and stores these addresses in document database 19. Retrieve module 18 accesses the next document specified in document database 19, retrieves a specified document, and extracts additional document addresses from the retrieved document to store in document database 19. This procedure repeats so that retrieve module 18 continuously retrieves different documents from network 16. Retrieve module 18 may include any appropriate sorting, ranking, or searching function to arrange document addresses or to ensure that only one occurrence of a document address appears in document database 19. Retrieve module 18 extracts document addresses in the form of URL addresses, IP addresses, FTP addresses, UseNet or TelNet addresses, electronic mail addresses, or any other address in which retrieve module 18 may access a document.

Upon specifying a document address at step 100, retrieve module 18 retrieves the specified document at step 102. Rate module 20 initializes a pointer to mark the beginning of the document and initializes the document ratings to zero at step 103. The document ratings correspond to different rating categories, such as sex, violence, profanity, nudity, racism, and other appropriate categories.

Rate module 20 retrieves a rule-set associated with a rating category at step 104, and selects the next rating rule from the current rule-set at step 105. If the rule applies to this retrieved document at step 106, rate module 20 applies the rule to generate a rule rating for the document at step 108. For example, application of the rule may comprise any appropriate searching, proximity determination, contextual application, or other operation on one or more words specified by the rule.

To apply the rule, server 12 may reduce selected words retrieved from the document to their root form to eliminate tenses and plurals. For example, rate module 20 may treat the word "expressed" as "express" and the word "animals" as "animal". Also, rate module 20 may strip suffixes and prefixes from selected words to generate base words for rating, indexing, or searching. For example, the word "sexual" becomes "sex" and the word "replacement" becomes "replace". Rate module 20 may also discard particularly common words or noise words, such as "the", "a", "an", etc. In this manner, rate module 20 reduces the size of rate file 24 and increases rating, indexing, and searching efficiency.

The rule rating generated by rate module 20 may be, for example, a numeric value ranging from 0.1 to 1.0 indicating if and to what degree a word or phrase is inappropriate, objectionable, or offensive. Exemplary values of rule ratings may include 0.0 (not offensive), 0.5 (moderately offensive), and 1.0 (very offensive). Also, the rule rating may include or depend on certain categories of objectionable subject matter, such as violence, nudity, language, or adult themes. In a particular embodiment, the selection of rule ratings and their associated rated words may depend on the relative emphasis to screen particular categories of objectionable subject matter. Rating rules database 22 may contain one or more fixed or customized rule-sets to satisfy any relevant consideration or emphasis on inappropriate, objectionable, or offensive subject matter.

Rating rules database 22 may store a proximity requirement that determines the context in which one or more rated words are used. For example, a proximity requirement that "nude" or an alternative form appear within fifty words of the rated word "breast" must be met before adding the rule rating to the document rating. Alternatively, the proximity requirement may not be met if "cancer" appears within thirty words of the rated word "breast." The present invention contemplates any boolean (e.g., AND, OR, NOT) operators, proximity operators, replication operators, or other suitable operators that must be met to trigger the associated rating values.

After generating a rule rating at step 108, rate module 20 may also apply an appearance factor to the rule rating at step 110. For example, documents generated using HTML, HTML+, SGML, VRML, or other content development language may specify whether a word appears in the title, abstract, text, or other portions of the document. An appearance may be 1.0 for a title, 0.5 for an abstract, 0.3 for a section heading, and 0.1 for a text appearance. Rate module 20 adds the rule rating, whether adjusted by an appearance factor or not, to the overall document rating for the current rating category at step 112.

If more rules from the current rule-set are to be applied at step 113, the process continues at step 105 and retrieves the next rule from the current rule-set. If all rules from the current rule-set have been applied at step 113, then server 12 determines if more rule-sets should be processed to generate additional document ratings at step 114. The process returns to step 104 to apply the next rule-set.

After applying all rule-sets, server 12 may normalize the computed document ratings at step 116 to account for the number of words in the document or other suitable factor. Server 12 then stores the resulting document ratings with the associated document address in rate file 24 maintained in database 26 at step 118.

FIG. 3 illustrates rate file 24 that includes document addresses 200 and document ratings 202 for each rated document. Document addresses 200 may include a non-IP address 204, such as a uniform resource locator (URL) address, electronic mail address, or any other appropriate non-IP address. Document addresses 200 may also include an IP address 206 that comprises a series of numbers separated by periods. Both non-IP address 204 and IP address 206 may include a wildcard character such as an asterisk (*) to indicate that a document rating applies to all documents matching the address specification. Server 12, client 14, or both may maintain all or a portion of rate file 24 depicted in FIG. 3.

Document ratings 202 may include a numerical rating 208, a category rating 210, or an override rating 212 for each rating category. FIG. 3 illustrates document ratings 202 for the sex and violence rating categories, but may include more or less document ratings for other rating categories, such as profanity, racism, nudity, and others. Numerical rating 208 may be the value typically generated by the method of FIG. 2 that reflects the sum of rule ratings, whether or not adjusted by appearance factor, for each rating category. Category rating 210 may correspond to a range of numerical ratings 208. In a specific example, category ratings 210 designate different levels of age-appropriate or age-based content: early childhood (EC) represents maximum screening and only allows material rated appropriate for the youngest viewers; kids to adults (KA) designates material rated appropriate for everyone six years and over; teens (T) designates material rated for everyone thirteen years and over; mature audiences (M) designates material rated for everyone seventeen years and over; and adults only (AO) represents no screening and displays all material regardless of content. Override rating 212 represents a numerical rating or category rating that overrides the designation generated automatically by rate module 20. For example, a user of client 14 may use input module 42 to specify an override rating 212 for a particular document after reviewing its content. Override rating 212 provides flexibility at client 14 to restrict or liberalize, as appropriate, the document ratings automatically generated by rate module 20. Client 14 may communicate override rating 212 to server 12 for reevaluation and updating of the particular document rating in rate file 24 stored in database 26.

Entry 220 in rate file 24 specifies both a non-IP address 204 (http:www.intergo.com) and IP address 206 (111.11.1.11). Associated with these two addresses that specify a particular document in network 16 are a numerical rating 208 (0.0), a corresponding category rating 210 (EC), and an override rating 212 (KA) specified by the user of client 14 for the sex rating category. Similar ratings apply to the violence rating category. Entry 222 specifies a non-IP address 204 (joe@intergo.com) without a corresponding IP address 206, the determined numerical rating 208 (15.1), and corresponding category rating 210 (T) for the sex rating category. Similar ratings apply to the violence rating category. Entry 224 specifies a document by its IP address 206 (555.*.*.*) which includes wildcard characters in all but the first three digits. Therefore, entry 224 reflects a high level category rating 210 (AO) that applies to all included lower level documents at the specified IP address 206 for both the sex and violence category ratings.

Figure 4:
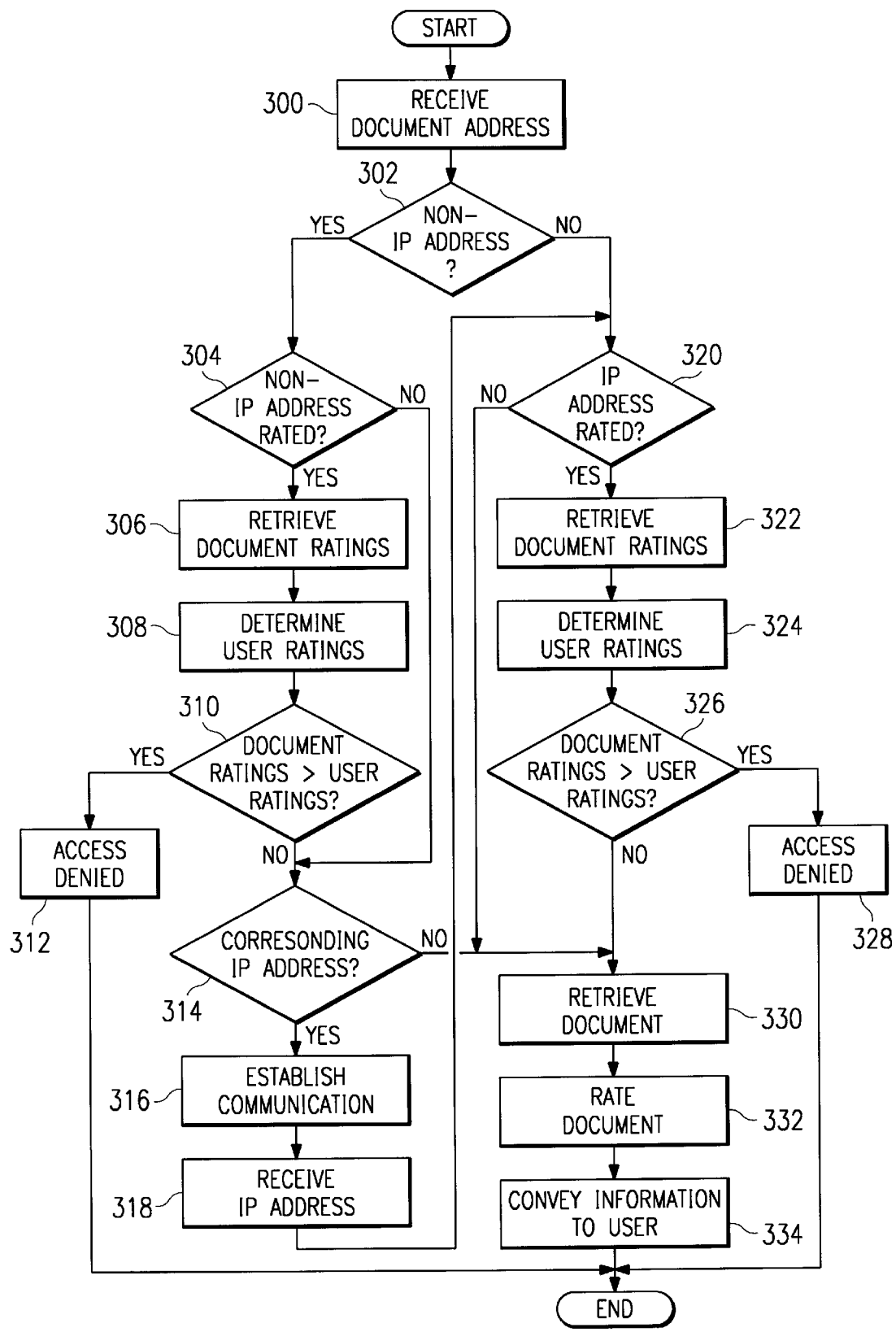
FIG. 4 illustrates a flow chart of a method for screening information using document ratings.

FIG. 4 illustrates a flow chart of a method for screening information performed by client 14. The method begins at step 300 where screen module 44 in client 14 receives a document address at step 300. For example, retrieve module 18 may communicate the document address to screen module 44 in response to user input. If the address is a non-IP address 204 at step 302, such as a uniform resource locator (URL) address or electronic mail address, screen module 44 determines if the non-IP address 204 has been rated at step 304. If the non-IP address 204 has been rated at step 304, screen module 44 retrieves document ratings 202 corresponding to the non-IP address 204 in rate file 24 at step 306. Screen module 44 determines the appropriate user ratings at step 308 which may correspond to or be associated with a user name, password, age, characteristic, or other information about the user of client 14. Like the document ratings, the user ratings may be by numerical ratings, category ratings, or override ratings in a number of rating categories.

Screen module 44 determines if the retrieved document ratings are greater than the user ratings at step 310. This may be performed using either numerical rating 208 or category rating 210, since category ratings 210 may be arranged in a hierarchical manner that allows a quantitative comparison. If multiple document ratings and user ratings are specified, screen module 44 compares each document rating to its corresponding user rating for each rating category. If any document rating is higher than an associated user rating at step 310, access is denied at step 312 and the method ends.

If no document ratings are greater than an associated user rating, screen module 44 determines if the non-IP address 204 has a corresponding IP address 206 at step 314. For example, a browser or FTP site may be identified by both a URL and IP address. If the site has a corresponding IP address 206, screen module 44 may perform a second screening function on the IP address 206. This is accomplished by first establishing communication at step 316 and receiving the IP address at step 318. This second screening function on IP address 206 provides additional assurances that the user of client 14 cannot retrieve inappropriate, objectionable, or offensive material using either a non-IP address 204 or an IP address 206.

If the document is IP address rated at step 320 or originally specified using an IP address 206 at step 302, screen module 44 retrieves document ratings corresponding to the IP address 206 in rate file 24, determines associated user ratings, compares the document ratings and the user ratings and, if appropriate, denies access to the document at steps 322–328, which are similar in scope and operation as steps 306–312 described above.

After screening on non-IP address 204 at steps 304–312, screening on IP address 206 at steps 320–328, or both, screen module 44 allows client 14 to continue or complete retrieval of the document at step 330. In the particular embodiment in which client 14 maintains a rate module 20 and rating rules database 22, and the retrieved document has not been rated, rate module 20 may rate the document at step 332. The method concludes when output module 46 conveys information contained in the document to the user of client 14 at step 334.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for rating information retrieved from a computer network, comprising:
    a retrieve module coupled to the computer network and operable to retrieve a document from the computer network using a document address;
    a rate module coupled to the retrieve module and operable to generate a document rating for the document in response to the content of the document; and
    a database operable to store the document rating and the document address.

2. The system of claim 1, further comprising a rating rule database coupled to the rate module, the rating rule database operable to store a plurality of rating rules, each rating rule having an associated rated word and a numeric value indicating the degree to which the rated word is inappropriate, objectionable, or offensive.

3. The system of claim 1, further comprising a rating rule database coupled to the rate module, the rating rule database operable to store a plurality of rule-sets, each rule-set comprising a plurality of rating rules associated with a rating category.

4. The system of claim 1, wherein the document rating corresponds to one of a plurality of age-based categories, each age-based category being defined as a range of the document rating.

5. The system of claim 1, wherein the document address comprises:
    a uniform resource locator address; and
    an Internet protocol address.

6. The system of claim 1, further comprising a remote computer coupled to the database and operated by a user having a user rating, the remote computer operable to receive the document address specified by the user and to retrieve the document rating identified by the document address, the remote computer further operable to prevent retrieval of the document from the computer network by comparing the document rating and the user rating.

7. The system of claim 1, further comprising a remote computer coupled to the database and operated by a user having a user rating, the remote computer comprising:
    a second database coupled to the database, the second database operable to store the document rating and the document address;
    a screen module coupled to the second database, the screen module operable to receive the document address specified by the user and to retrieve from the second database the document rating identified by the document address; and
    a second retrieve module coupled to the computer network and operable to retrieve the document in response to a comparison of the document rating and the user rating.

8. The system of claim 1, further comprising a remote computer coupled to the database and operated by a user having a user rating, the remote computer comprising:
    a second database operable to store an override document rating associated with the document address, the override document rating being different from the document rating stored in the database;
    a screen module coupled to the second database, the screen module operable to receive the document address specified by the user and to retrieve from the second database the override document rating identified by the document address; and
    a second retrieve module coupled to the computer network and operable to retrieve the document in response to a comparison of the override document rating and the user rating.

9. The system of claim 8, further comprising an update module coupled to the second database, the update module operable to communicate the override document rating and the document address to a remote site.

10. A method performed on a computer for rating information retrieved from a computer network, comprising:
    retrieving a document from the computer network using a document address;
    retrieving a plurality of rating rules, each rating rule having an associated rated word and a numeric value indicating the degree to which the rated word is inappropriate, objectionable, or offensive;
    applying the rating rules to the retrieved document in order to generate a plurality of rule ratings;
    summing the rule ratings to generate a document rating; and
    storing the document rating and the document address.

11. The method of claim 10, further comprising the step of communicating the document rating and the document address to a plurality of remote computers.

12. The method of claim 10, wherein the document address is specified by a user of the computer.

13. The method of claim 10, wherein the step of retrieving the document comprises:
    retrieving a first document; and
    retrieving the document using the document address specified in the first document.

14. The method of claim 10, wherein the plurality of rating rules are organized into a plurality of rule-sets, each rule-set associated with a rating category.

15. The method of claim 10, further comprising the step of associating one of a plurality of age-based categories with the document, each age-based category being defined as a range of the document rating.

16. The method of claim 10, wherein the address comprises:
    a uniform resource locator address; and
    an Internet protocol address.

17. A computer program stored in memory and executed on a computer, the computer program operable to perform the following steps:

receiving a document address of a document available from a computer network;

retrieving a plurality of rating rules, each rating rule having an associated rated word and a numeric value indicating the degree to which the rated word is inappropriate, objectionable, or offensive;

applying the rating rules to the retrieved document in order to generate a plurality of rule ratings;

summing the rule ratings to generate a document rating;

comparing the document rating to a user rating; and retrieving the document from the computer network if the comparison indicates that access to the document is appropriate.

18. The computer program of claim 17, wherein the document rating corresponds to a plurality of age-based categories, each age-based category being defined as a numerical range of the document rating.

19. The computer program of claim 17, wherein the document rating comprises an override document rating specified by a user of the computer.

20. The computer program of claim 17, wherein the step of receiving a document address comprises:

establishing a connection with a remote site in the computer network to access the document; and retrieving an Internet protocol address for the remote site.

21. The computer program of claim 17, wherein the document address comprises:

a uniform resource locator address; and an Internet protocol address.

22. The computer program of claim 17, wherein the user rating corresponds to a current user of the computer program.

23. The computer program of claim 17, further comprising the steps of:

receiving a document rating and a document address from a remote site; and storing the document rating and the document address in a database.

24. The computer program of claim 23, wherein the steps of receiving and storing are performed in response to accessing the remote site using the computer network.

* * * * *